(12) United States Patent
Delville et al.

(10) Patent No.: US 10,626,254 B1
(45) Date of Patent: Apr. 21, 2020

(54) PNEUMATIC TIRE

(71) Applicant: The Goodyear Tire & Rubber Company, Akron, OH (US)

(72) Inventors: Jérôme Joel Daniel Delville, Réhon (FR); Christian Jean-Marie Kaes, Schrondweiler (LU); Pascal Patrick Steiner, Vichten (LU); Carlo Kanz, Mamer (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 16/263,339

(22) Filed: Jan. 31, 2019

(51) Int. Cl.
| | |
|---|---|
| *C08L 9/06* | (2006.01) |
| *C08L 25/18* | (2006.01) |
| *C08K 3/36* | (2006.01) |
| *C08K 3/30* | (2006.01) |
| *B60C 1/00* | (2006.01) |
| *C08L 7/00* | (2006.01) |
| *C08L 45/00* | (2006.01) |
| *C08L 61/06* | (2006.01) |

(52) U.S. Cl.
CPC .............. *C08L 9/06* (2013.01); *B60C 1/0016* (2013.01); *C08K 3/30* (2013.01); *C08K 3/36* (2013.01); *C08L 25/18* (2013.01); *C08K 2003/3009* (2013.01); *C08L 7/00* (2013.01); *C08L 45/00* (2013.01); *C08L 61/06* (2013.01)

(58) Field of Classification Search
CPC .... C08L 9/06; C08L 25/18; C08L 7/00; C08L 45/00; C08L 61/06; B60C 1/0016; C08K 3/30; C08K 3/36; C08K 2003/3009
USPC ....................................................... 523/157
See application file for complete search history.

(56) References Cited

U.S. PATENT DOCUMENTS

| | | | |
|---|---|---|---|
| 4,373,041 A | | 2/1983 | Wood et al. |
| 5,447,971 A | * | 9/1995 | Bergh ................. C08K 3/36 152/905 |
| 5,616,639 A | * | 4/1997 | Lucas ............... B60C 1/0016 524/262 |
| 7,253,225 B2 | | 8/2007 | Labauze et al. |
| 7,441,572 B2 | | 10/2008 | Weydert et al. |
| 9,126,457 B2 | | 9/2015 | Kaes et al. |
| 9,163,126 B2 | | 10/2015 | Sandstrom |
| 2010/0144946 A1 | * | 6/2010 | Costantini ......... B60C 1/0016 524/432 |
| 2011/0294936 A1 | | 12/2011 | Sato |
| 2014/0336330 A1 | | 11/2014 | Costantini et al. |
| 2017/0130036 A1 | | 5/2017 | Kushida |
| 2017/0190887 A1 | * | 7/2017 | Sakurai ................. C08L 7/00 |

FOREIGN PATENT DOCUMENTS

| | | |
|---|---|---|
| EP | 2799480 A1 | 11/2014 |
| EP | 2743301 B1 | 1/2016 |
| JP | H10204216 A | 8/1998 |

\* cited by examiner

*Primary Examiner* — Angela C Scott
(74) *Attorney, Agent, or Firm* — John D. DeLong

(57) ABSTRACT

The invention is directed to a pneumatic tire comprising a vulcanizable rubber composition, the vulcanizable rubber composition comprising: from 75 to 85 phr of a styrene-butadiene rubber having a bound styrene content of from 30 to 50 percent by weight, a vinyl 1,2 content of from 10 to 30 percent by weight based on the rubber weight, and a Tg ranging from −40 C to −20 C; from 0 to 25 phr of natural rubber or synthetic polyisoprene; from 0 to 20 phr of cis-1,4 polybutadiene having a Tg of from −110° C. to −90° C.; from 100 to 150 phr of silica; from 20 to 40 phr of a combination resin comprising a polyterpene resin, an alkylphenol formaldehyde resin, and a rosin acid; from 30 to 60 phr of oil; and from 5 to 25 phr of a sulfur containing organosilicon compound.

13 Claims, No Drawings

PNEUMATIC TIRE

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads.

SUMMARY OF THE INVENTION

The invention is directed to a pneumatic tire having a tread comprising a vulcanizable rubber composition comprising, expressed as parts by weight per 100 parts by weight of elastomer (phr), from 75 to 85 phr of a styrene-butadiene rubber having a bound styrene content of from 30 to 50 percent by weight, a vinyl 1,2 content of from 10 to 30 percent by weight based on the rubber weight, and a Tg ranging from −40 C to −20 C;

from 0 to 25 phr of natural rubber or synthetic polyisoprene;

from 0 to 20 phr of cis-1,4 polybutadiene having a Tg of from −110° C. to −90° C.;

from 100 to 150 phr of silica;

from 20 to 40 phr of a combination resin comprising a polyterpene resin, an alkylphenol formaldehyde resin, and a rosin acid;

from 30 to 60 phr of oil;

from 5 to 25 phr of a sulfur containing organosilicon compound.

DESCRIPTION OF THE INVENTION

The invention is directed to a pneumatic tire having a tread comprising a vulcanizable rubber composition comprising, expressed as parts by weight per 100 parts by weight of elastomer (phr), from 75 to 85 phr of a styrene-butadiene rubber having a bound styrene content of from 30 to 50 percent by weight, a vinyl 1,2 content of from 10 to 30 percent by weight based on the rubber weight, and a Tg ranging from −40 C to −20 C;

from 0 to 25 phr of natural rubber or synthetic polyisoprene;

from 0 to 20 phr of cis-1,4 polybutadiene having a Tg of from −110° C. to −90° C.;

from 100 to 150 phr of silica;

from 20 to 40 phr of a combination resin comprising a polyterpene resin, an alkylphenol formaldehyde resin, and a rosin acid;

from 30 to 60 phr of oil;

from 5 to 25 phr of a sulfur containing organosilicon compound. In various embodiments the vulcanization rubber composition may have the following components:

| Components | Range, phr |
| --- | --- |
| Styrene-butadiene rubber, 30-50 percent styrene, 10-30 percent vinyl | 75-85 |
| Natural Rubber or synthetic polyisoprene | 0-25 |
| Cis 1,4-Polybutadiene | 0-20 |
| Silica | 100-150 |
| Carbon black | 1-20 |
| Resins | 20-40 |
| Oils | 30-60 |
| Silane coupling agents (silane polysulfides and mercaptosilanes) | 5-25 |
| Processing aids (waxes, fatty acids, fatty acid metal salts, fatty acid esters) | 2-10 |
| Antidegradants (dihydroquinolines, phenylenediamines, etc) | 2-10 |
| Curatives (sulfur, accelerators) | 4-10 |

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials, and such terms are well known to those having skill in the rubber mixing or rubber compounding art.

One component of the rubber composition is from 75 to 85 phr of a styrene-butadiene rubber, wherein the styrene-butadiene rubber is i) a solution-polymerized styrene-butadiene rubber with a bound styrene content of from 30 to 50 percent by weight, a vinyl 1,2 content of from 10 to 40 percent by weight based on the rubber weight, and a Tg of from about −40° C. to about −20° C.

As the styrene-butadiene rubber, suitable solution polymerized styrene-butadiene rubbers may be made, for example, by organo lithium catalyzation in the presence of an organic hydrocarbon solvent. The polymerizations employed in making the rubbery polymers are typically initiated by adding an organolithium initiator to an organic polymerization medium that contains the monomers. Such polymerizations are typically carried out utilizing continuous polymerization techniques. In such continuous polymerizations, monomers and initiator are continuously added to the organic polymerization medium with the rubbery polymer synthesized being continuously withdrawn. Such continuous polymerizations are typically conducted in a multiple reactor system. Suitable polymerization methods are known in the art, for example as disclosed in U.S. Pat. Nos. 4,843,120; 5,137,998; 5,047,483; 5,272,220; 5,239,009; 5,061,765; 5,405,927; 5,654,384; 5,620,939; 5,627,237; 5,677,402; 6,103,842; and 6,559,240.

As the styrene-butadiene rubber, suitable solution polymerized styrene-butadiene rubbers are available commercially, such as SE-SLR® 6430 from Trinseo and the like. Such solution polymerized styrene-butadiene rubber may be tin- or silicon-coupled, as is known in the art. In one embodiment, suitable SSBR may be at least partially silicon-coupled.

Another component of the rubber composition is from about 0 to about 25 phr of natural rubber or synthetic polyisoprene. In one embodiment, the rubber composition comprises from 15 to 25 phr of natural rubber or synthetic polyisoprene. In one embodiment, the rubber composition comprises from 5 to 15 phr of natural rubber or synthetic polyisoprene.

Another component of the rubber composition is from 0 to about 20 phr of cis-1,4 polybutadiene, also known as polybutadiene rubber or polybutadiene (BR). In one embodiment, the rubber composition comprises from 5 to 15 phr of cis-1,4 polybutadiene. Suitable polybutadiene rubbers may be prepared, for example, by organic solution polymerization of 1,3-butadiene using lithium or neodymium catalysts. The BR may be conveniently characterized, for example, by having at least a 90 percent cis 1,4-content and a glass transition temperature Tg in a range of from −90 to −110° C. Suitable polybutadiene rubbers are available commercially, such as Budene® 1223 from Goodyear and the like.

A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute.

The rubber composition may also include from 30 to 60 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. In one embodiment, the rubber composition includes a low PCA oil. Suitable low PCA oils include but are not limited to mild extraction solvates (MES), treated distillate aromatic extracts (TDAE), residual aromatic extract (RAE), SRAE, and heavy napthenic oils as are known in the art; see for example U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917.

Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts*, 2003, 62nd edition, published by the Institute of Petroleum, United Kingdom.

Other oils may also be used, including aromatic, paraffinic, naphthenic, and vegetable oils.

Resins may be used in the rubber composition and are generally present in an amount ranging from about 20 to about 40 phr. Suitable resins include alphamethyl styrene resins, coumarone type resins, including coumarone-indene resins and mixtures of coumarone resins, naphthenic oils, phenol resins, and rosins. Other suitable resins include phenol-terpene resins such as phenol-acetylene resins, phenol-formaldehyde resins, alkyl phenol-formaldehyde resins, terpene-phenol resins, polyterpene resins, and xylene-formaldehyde resins. Further suitable resins include petroleum hydrocarbon resins such as synthetic polyterpene resins; aromatic hydrocarbon resins; resins resulting from the polymerization of styrene and alphamethyl styrene; aliphatic hydrocarbon resins; aliphatic cyclic hydrocarbon resins, such as dicyclopentadiene resins; aliphatic aromatic petroleum resins; hydrogenated hydrocarbon resins; hydrocarbon tackified resins; aliphatic alicyclic petroleum resins; rosin derivatives; and terpene resins. In one embodiment, the resin is selected from hydrocarbon resins synthesized by cationic polymerization of styrene and alphamethyl styrene, and coumarone-indene resins.

In one embodiment, the resin comprises a combination of polyterpene resin, alkyl phenol-formaldehyde resin, and rosin acid. In one embodiment, the resin comprises from 20 to 30 phr of polyterpene resin, from 1 to 10 phr of alkyl phenol formaldehyde resin, and from 1 to 5 phr of rosin acid.

Suitable polyterpene resins may be comprised of, for example, polymers of at least one of limonene, alpha pinene and beta pinene and having a softening point in a range of from about 60 C to about 160 C. In one embodiment, the polyterpene resin is resin Dercolyte A115 from DRT, comprising a homopolymer of alpha pinene with a softening point of 115 C (ASTM test method E2858T).

Representative of various alkylphenol/formaldehyde resins are, for example, resins in which the alkylphenol is, for example comprised of tertiary octylphenol or tertiary butylphenol, such as, for example, a product of formaldehyde and such alkylphenol. It is believed that the tertiary octylphenol is the most common alkylphenol for such alkylphenol/formaldehyde rubber tackifying resins. The SP-1068 resin from SI group is considered herein to be a typical resin as an unreactive alkylphenol/formaldehyde resin (para-tertiary octyl phenol/formaldehyde resin formed as a reaction product of para-tertiary octylphenol and formaldehyde).

The rosin acids suitable for use in the silica-rich rubber compositions include gum rosin acid, wood rosin acid and tall oil rosin acid, and hydrogenated and disproportionated forms thereof, which are well known to those skilled in such art. For example, see "Rosin and Rosin Derivatives", found in the Encyclopedia of Chemical Technology, Second Edition, 1968, Pages 475 through 508.

Resins derived from rosin acids and derivatives may be used. Gum and wood rosin have much the same composition, although the amount of the various isomers may vary. They typically contain about 10 percent by weight neutral materials, 53 percent by weight resin acids containing two double bonds, 13 percent by weight of resin acids containing one double bond, 16 percent by weight of completely saturated resin acids and 2 percent of dehydroabietic acid which contains an aromatic ring but no unsaturation. There are also present about 6 percent of oxidized acids. Representative of the diunsaturated acids include abietic acid, levopimaric acid and neoabietic acid. Representative of the monounsaturated acids include dextropimaric acid and dihydroabietic acid. A representative saturated rosin acid is tetrahydroabietic acid.

The vulcanizable rubber composition may include from about 100 to about 150 phr of silica. The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, 315 etc.; silicas available from Rhodia, with, for example, designations of Z1165MP and Z165GR and silicas available from Degussa AG with, for example, designations VN2 and VN3, etc.

Pre-hydrophobated precipitated silica may be used. By pre-hydrophobated, it is meant that the silica is pretreated, i.e., the pre-hydrophobated precipitated silica is hydrophobated prior to its addition to the rubber composition by treatment with at least one silane. Suitable silanes include but are not limited to alkylsilanes, alkoxysilanes, organoalkoxysilyl polysulfides and organomercaptoalkoxysilanes. Alternatively, the precipitated silica may be pre-treated with a silica coupling agent comprised of, for example, an alkoxyorganomercaptosilane or combination of alkoxysilane and alkoxyorganomercaptosilane prior to blending the pre-treated silica with the rubber instead of reacting the precipitated silica with the silica coupling agent in situ within the rubber. For example, see U.S. Pat. No. 7,214,731. For various pre-treated precipitated silicas see, for example, U.S. Pat. Nos. 4,704,414, 6,123,762 and 6,573,324. Suitable pre-treated or pre-hydrophobated silica is available commercially for example as Agilon 400 from PPG.

Suitable carbon blacks can be used in a range from 1 to 20 phr. Representative examples of such carbon blacks include N110, N121, N134, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. Suitable carbon blacks have iodine absorptions ranging from 9 to 220 g/kg and DBP oil absorption number ranging from 34 to 150 cm³/100 g. In one embodiment, the carbon black has an iodine absorption ranging from 130 to 210 g/kg according to ASTM-D1510 and a DBP oil absorption number ranging from 110 to 140 cc/100 g according to ASTM D-2414.

In one embodiment the rubber composition for use in the tire tread may contain a conventional sulfur containing organosilicon compound. Examples of suitable sulfur containing organosilicon compounds are of the formula:

   I in which Z is selected from the group consisting of

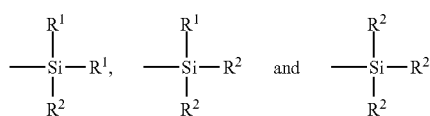

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis (triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis (tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis (methyl ethoxypropoxysilylethyl) tetrasulfide, 3,3'-bis (diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

In one embodiment, the sulfur containing organosilicon compounds are the 3,3'-bis(trimethoxy or triethoxy silylpropyl) sulfides. In one embodiment, the sulfur containing organosilicon compounds are 3,3'-bis(triethoxysilylpropyl) disulfide and 3,3'-bis(triethoxysilylpropyl) tetrasulfide. Therefore, as to formula I, Z may be

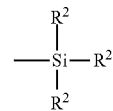

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. As disclosed in U.S. Pat. No. 6,608,125, these sulfur containing organosilicon compounds are of the formula G-C(=O)—S—CH₂CH₂CH₂SiX₃ wherein each X is an independently selected RO— group wherein each R is independently selected from the group consisting of hydrogen, alkyl that may or may not contain unsaturation, alkenyl groups, aryl groups, and aralkyl groups, such moieties other than hydrogen having from 1 to 18 carbon atoms, and G is a monovalent alkyl of from 6 to 8 carbon atoms. In one embodiment, the sulfur containing organosilicon compounds includes 3-(octanoylthio)-1-propyltriethoxysilane, CH₃(CH₂)₆C(=O)—S—CH₂CH₂CH₂Si(OCH₂CH₃)₃, which is available commercially as NXT™ from GE Silicones.

In one embodiment, the sulfur containing organosilicon compound is a combination of 3,3'-bis(triethoxypropylsilyl) tetrasulfide and 3-(octanoylthio)-1-propyltriethoxysilane The amount of the sulfur containing organosilicon compound in a rubber composition will vary depending on the level of other additives that are used. Generally speaking, the amount of the compound will range from 5 to 25 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

Other curatives may be used, including but not limited to from 0.5 to 5 phr of 1,6-bis(N,N' dibenzylthiocarbamoyldithio)-hexane available as Vulcuren from Lanxess.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the compound is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. All parts are parts by weight unless specifically identified otherwise.

Example 1

In this example, rubber compounds according to the invention are illustrated. Three rubber compounds were mixed in a multistep mix procedure using the recipes in Table 1, with all amounts given in phr. The compounds were then fabricated as tire treads and tested for various performance indicators, given as indexes in Table 2 with higher values being desirable. As seen in Table 2, the inventive samples 1 and 2 showed significant improvement in wet braking and improvement in rolling resistance and treadwear versus control.

TABLE 1

|  | Control | Sample 1 |
|---|---|---|
| SSBR[1] | 40 | 80 |
| SSBR[2] | 50 | 0 |
| Polybutadiene[3] | 10 | 10 |
| Natural Rubber | 0 | 10 |
| Oil[4] | 39 | 35 |
| Silica[5] | 112 | 0 |
| Silica[6] | 0 | 130 |
| Silane disulfide[7] | 11.2 | 0 |
| Mercaptosilane[8] | 0 | 10.4 |
| Silane tetrasulfide/N330[9] | 2 | 2 |
| Alkylphenol Formaldehyde resin[10] | 5 | 2 |
| Polyterpene resin[11] | 0 | 22 |
| AMS resin[12] | 12 | 0 |
| Rosin acid resin[13] | 3 | 2 |
| Processing aids | 4.9 | 4.9 |
| Antidegradants[14] | 4.8 | 4.7 |
| Accelerators[15] | 5.7 | 4.5 |
| Zinc oxide | 1 | 1 |
| Sulfur | 0.8 | 0.7 |

[1]SE SLR6430 SSBR, 40% styrene, 14% vinyl, Tg (OE) = −34° C., extended with 37.5 phr TDAE oil, from Trinseo, given on oil-free basis
[2]TUFDENE E680 SSBR, 34% styrene, 38% vinyl, Tg (OE) = −25° C., extended with 37.5 phr SRAE oil, from Asahi Chemical, given on oil-free basis
[3]Budene 1223 from Goodyear Tire & Rubber Chemical
[4]Oil from extension of elastomers and freely added TDAE oil
[5]Precipitated Silica, BET Nitrogene Surface Area = 210 m2/g
[6]Precipitated Silica, BET Nitrogene Surface Area = 160 m2/g
[7]Bis(triethoxysilylpropyl) disulfide
[8]3-(octanoylthio)-1-propyltriethoxysilane as NXT
[9]Bis(triethoxysilylpropyl) tetrasulfide, 50% by weight on N330 carbon black
[10]octyl phenol/formaldehyde resin as SP1068 from SI Group
[11]alpha-pinene resin with softening point 112-118 C., as Dercolyte A-115 from DRT
[12]styrene/ alphamethyl styrene copolymer resin with Tg = +39 C., as Sylvatraxx 4401 from Arizona Chemical
[13]gum rosin as Ultrablend 1000
[14]p-phenylenediamine and dihydroquinoline types
[15]Sulfenamide, guanidine and 1,6-bis(N,N' dibenzylthiocarbamoyldithio)-hexane

TABLE 2

|  | Control | Sample 1 |
|---|---|---|
| rolling resistance | 100 | 101 |
| wet braking | 100 | 104 |
| road treadwear | 100 | 101 |

What is claimed is:

1. A pneumatic tire comprising a vulcanizable rubber composition, the vulcanizable rubber composition comprising:
    from 75 to 85 phr of a styrene-butadiene rubber having a bound styrene content of from 30 to 50 percent by weight, a vinyl 1,2 content of from 10 to 30 percent by weight based on the rubber weight, and a Tg ranging from −40 C to −20 C;
    from 0 to 25 phr of natural rubber or synthetic polyisoprene;
    from 0 to 20 phr of cis-1,4 polybutadiene having a Tg of from −110° C. to −90° C.;
    from 100 to 150 phr of silica;
    from 20 to 40 phr of a combination resin comprising from 20 to 30 phr of a polyterpene resin, from 1 to 10 phr of an alkylphenol formaldehyde resin, and from 1 to 5 phr of a rosin acid;
    from 30 to 60 phr of oil;
    from 5 to 25 phr of a sulfur containing organosilicon compound.

2. The pneumatic tire of claim 1, wherein the rubber composition includes from 0.5 to 5 phr of 1,6-bis(N,N'-dibenzylthiocarbamoyldithio)-hexane.

3. The pneumatic tire of claim 1, wherein the sulfur containing organosilicon compound comprises 3-(octanoylthio)-1-propyltriethoxysilane and bis(triethoxysilylpropyl) tetrasulfide.

4. The pneumatic tire of claim 1, wherein the rubber composition includes from 15 to 25 phr of natural rubber.

5. The pneumatic tire of claim 1, wherein the rubber composition includes from 5 to 15 phr of the natural rubber and 5 to 15 phr of the cis-1,4 polybutadiene.

6. The pneumatic tire of claim 1, wherein the polyterpene resin is an alpha pinene resin.

7. The pneumatic tire of claim 1, wherein the alkylphenol formaldehyde resin is an octylphenol formaldehyde resin.

8. A pneumatic tire comprising a vulcanizable rubber composition, the vulcanizable rubber composition comprising:
    from 75 to 85 phr of a styrene-butadiene rubber having a bound styrene content of from 30 to 50 percent by weight, a vinyl 1,2 content of from 10 to 30 percent by weight based on the rubber weight, and a Tg ranging from −40 C to −20 C;
    from 15 to 25 phr of natural rubber or synthetic polyisoprene;
    from 100 to 150 phr of silica;
    from 20 to 40 phr of a combination resin comprising from 20 to 30 phr of a polyterpene resin, from 1 to 10 phr of an alkyl phenol formaldehyde resin, and from 1 to 5 phr of a rosin acid;
    from 30 to 60 phr of oil;
    from 5 to 25 phr of a sulfur containing organosilicon compound.

9. The pneumatic tire of claim 8, wherein the polyterpene resin is an alpha pinene resin.

10. The pneumatic tire of claim 8, wherein the alkylphenol formaldehyde resin is an octylphenol formaldehyde resin.

11. A pneumatic tire comprising a vulcanizable rubber composition, the vulcanizable rubber composition comprising:
    from 75 to 85 phr of a styrene-butadiene rubber having a bound styrene content of from 30 to 50 percent by weight, a vinyl 1,2 content of from 10 to 30 percent by weight based on the rubber weight, and a Tg ranging from −40 C to −20 C;
    from 5 to 15 phr of natural rubber or synthetic polyisoprene;
    from 5 to 15 phr of cis-1,4 polybutadiene having a Tg of from −110° C. to −90° C.;
    from 100 to 150 phr of silica;
    from 20 to 40 phr of a combination resin comprising from 20 to 30 phr of a polyterpene resin, from 1 to 10 phr of an alkyl phenol formaldehyde resin, and from 1 to 5 phr of a rosin acid;
    from 30 to 60 phr of oil;
    from 5 to 25 phr of a sulfur containing organosilicon compound.

12. The pneumatic tire of claim 11, wherein the polyterpene resin is an alpha pinene resin.

13. The pneumatic tire of claim 11, wherein the alkylphenol formaldehyde resin is an octylphenol formaldehyde resin.

* * * * *